US011542427B2

(12) United States Patent
Meng et al.

(10) Patent No.: US 11,542,427 B2
(45) Date of Patent: Jan. 3, 2023

(54) CORROSION INHIBITOR COMPOSITIONS AND METHODS OF USE IN ACID STIMULATION OPERATIONS

(71) Applicant: CHEMEOR, INC., Covina, CA (US)

(72) Inventors: Fei Meng, Covina, CA (US); Mitsuru Uno, Wakayama (JP); Yongchun Tang, Covina, CA (US); Lucino González Rameño, Chapala (MX)

(73) Assignee: CHEMEOR, INC., Covina, CA (US)

( * ) Notice: Subject to any disclaimer, the term of this patent is extended or adjusted under 35 U.S.C. 154(b) by 0 days.

(21) Appl. No.: 17/271,396

(22) PCT Filed: Aug. 21, 2019

(86) PCT No.: PCT/US2019/047459
§ 371 (c)(1),
(2) Date: Feb. 25, 2021

(87) PCT Pub. No.: WO2020/046670
PCT Pub. Date: Mar. 5, 2020

(65) Prior Publication Data
US 2021/0317359 A1 Oct. 14, 2021

Related U.S. Application Data

(60) Provisional application No. 62/725,410, filed on Aug. 31, 2018.

(51) Int. Cl.
| | | |
|---|---|---|
| *C09K 8/54* | (2006.01) | |
| *C09K 8/60* | (2006.01) | |
| *C09K 8/74* | (2006.01) | |
| *C23F 11/04* | (2006.01) | |
| *C23F 11/12* | (2006.01) | |
| *C23F 11/14* | (2006.01) | |

(52) U.S. Cl.
CPC ............... *C09K 8/54* (2013.01); *C09K 8/602* (2013.01); *C09K 8/74* (2013.01); *C23F 11/04* (2013.01); *C23F 11/122* (2013.01); *C23F 11/141* (2013.01); *C23F 11/149* (2013.01); *C09K 2208/32* (2013.01)

(58) Field of Classification Search
None
See application file for complete search history.

(56) References Cited

U.S. PATENT DOCUMENTS

| | | | | |
|---|---|---|---|---|
| 4,738,897 A | * | 4/1988 | McDougall | E21B 43/32 428/407 |
| 5,543,388 A | * | 8/1996 | Williams | C23F 11/04 507/939 |
| 6,866,797 B1 | * | 3/2005 | Martin | C09K 8/54 507/939 |
| 2011/0077174 A1 | * | 3/2011 | Cassidy | C23F 11/04 507/243 |
| 2011/0155959 A1 | * | 6/2011 | Cassidy | C09K 8/54 252/394 |
| 2013/0267446 A1 | * | 10/2013 | De Wolf | C09K 8/86 507/241 |
| 2014/0120276 A1 | * | 5/2014 | De Wolf | C23F 11/144 428/34.1 |
| 2015/0005216 A1 | * | 1/2015 | De Wolf | C09K 8/528 134/201 |
| 2015/0354323 A1 | | 12/2015 | Treybig et al. | |
| 2017/0247600 A1 | | 8/2017 | Chen et al. | |

FOREIGN PATENT DOCUMENTS

WO WO 2006/136262 A1 12/2006

OTHER PUBLICATIONS

International Search Report and Written Opinion dated Oct. 31, 2019 in PCT/US2019/047459 filed on Aug. 21, 2019.

* cited by examiner

*Primary Examiner* — John J Figueroa
(74) *Attorney, Agent, or Firm* — Oblon, McClelland, Maier & Neustadt, L.L.P.

(57) ABSTRACT

A corrosion inhibitor composition, containing (a) a cinnamaldehyde compound, (b) an alkoxylated fatty amine, and (c) an imidazoline compound, and optionally (d) a surfactant, and (e) a solvent. A method of inhibiting corrosion of metal in contact with an acidic medium in an oil or gas field environment by introducing the corrosion inhibitor composition into the acidic medium, such as during acid stimulation operations.

19 Claims, No Drawings

CORROSION INHIBITOR COMPOSITIONS AND METHODS OF USE IN ACID STIMULATION OPERATIONS

BACKGROUND OF THE INVENTION

Field of the Invention

The present invention relates to corrosion inhibitor compositions, as well as methods of using the corrosion inhibitor compositions in acid stimulation operations.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The recovery of hydrocarbons (petroleum, natural gas, etc.) from geological formations varies due to factors related to the heterogeneity of the deposit, such as the type of rocky body forming the geological formation, the type of fluid produced, and the permeability and drainage mechanisms of the geological formation.

To help improve the overall permeability of the geological formation, and thus the flow and recovery of hydrocarbons, stimulation techniques with acidic fluids (e.g., HCl, HF, etc.) are often used to create conducting routes from the deposit to the well and passing through the area surrounding the well which has been damaged during drilling.

Acid stimulation may involve (1) injecting acidic fluids into the well to react with and to dissolve the area surrounding the well which has been damaged; (2) injecting acidic fluids through the well and into the geological formation to react with and to dissolve rock to create small conducting channels (e.g., conducting wormholes) through which the hydrocarbon will flow; and (3) injecting acidic fluids through the well at pressures sufficient to fracture the rock, thus creating a large flow channel allowing the hydrocarbon to migrate rapidly from the rock to the well.

The most common agents used in stimulation operations are mineral acids such as hydrochloric (HCl) and/or hydrofluoric acid (HF), generally in the form of 15% by weight acid solutions, due to their ability to dissolve minerals and pollutants introduced in the well during drilling or recovery operations.

A problem inherent to stimulation with acids is the corrosion of the metal equipment such as pumps, pipes, casings of the well caused by contact with the acidic stimulation fluids, as well as other corrosive components from the formation that may become entrained therewith, for example, $CO_2$, brine, and $H_2S$. The reaction between the acidic stimulation fluids and downhole metal equipment may also result in partial neutralization of the acidic fluids prior to entering the geological formation, and the production of highly undesirable transition metal ions within the subterranean formation.

Therefore, it is common practice to employ corrosion inhibitors during acid stimulation treatments of crude oil and natural gas wells. However, many corrosion inhibitors suffer from poor performance at low concentrations and particularly poor performance under high temperatures and under strongly acidic solutions, for example acidic solutions containing greater than or equal to 15 wt. % acid, necessitating the need for large quantities of corrosion inhibitors to be used. The use of such large quantities of corrosion inhibitors becomes increasingly problematic as the cost to produce the corrosion inhibitor increases.

SUMMARY OF THE INVENTION

In view of the forgoing, there is a need for corrosion inhibitor compositions that can be used at low concentrations for preventing corrosion of metal in various oil or gas field environments, including high temperature and highly acidic conditions common to acid stimulation operations.

Accordingly, it is one object of the present invention to provide novel corrosion inhibitor compositions.

It is another object of the present disclosure to provide novel methods of inhibiting corrosion of metal in contact with an acidic medium in an oil or gas field environment by introducing the corrosion inhibitor compositions.

These and other objects, which will become apparent during the following detailed description, have been achieved by the inventors' discovery that the combination of a cinnamaldehyde compound (a), an alkoxylated fatty amine (b), and an imidazoline compound (c), particularly in the desired ratios set forth, provides a superior anticorrosion effect that enables the corrosion inhibitor compositions to maintain their effectiveness at relatively low concentrations under strongly acidic conditions.

Thus, the present invention provides:

(1) A corrosion inhibitor composition comprising:
(a) a cinnamaldehyde compound;
(b) an alkoxylated fatty amine; and
(c) an imidazoline compound.

(2) The corrosion inhibitor composition of (1), wherein the cinnamaldehyde compound (a) is cinnamaldehyde.

(3) The corrosion inhibitor composition of (1) or (2), wherein the alkoxylated fatty amine (b) is an alkoxylated fatty monoamine.

(4) The corrosion inhibitor composition of (1), wherein the alkoxylated fatty amine (b) is an ethoxylated fatty amine.

(5) The corrosion inhibitor composition of any one of (1) to (4), wherein the alkoxylated fatty amine (b) is an ethoxylated fatty monoamine.

(6) The corrosion inhibitor composition of any one of (1) to (5), wherein the imidazoline compound (c) is formed from a reaction between a fatty acid or an ester derivative thereof and a polyamine containing at least one ethylene diamine group.

(7) The corrosion inhibitor composition of (6), wherein the fatty acid is tall oil fatty acid, and wherein the polyamine is diethylenetriamine (DETA) or aminoethylethanolamine (AEEA).

(8) The corrosion inhibitor composition of any one of (1) to (7), further comprising (c1) a fatty amidoamine, which is formed from a reaction between a fatty acid or an ester derivative thereof and a polyamine containing at least one ethylene diamine group, wherein a weight ratio of the imidazoline compound (c) to the fatty amidoamine (c1) is from 1:1 to 10:1.

(9) The corrosion inhibitor composition of any one of (1) to (8), wherein a weight ratio of the cinnamaldehyde compound (a) to the alkoxylated fatty amine (b) is from 1:6 to 50:1.

(10) The corrosion inhibitor composition of any one of (1) to (9), wherein a weight ratio of the cinnamaldehyde compound (a) to the alkoxylated fatty amine (b) is from 1:2 to 15:1.

(11) The corrosion inhibitor composition of any one of (1) to (10), wherein a weight ratio of the cinnamaldehyde compound (a) to the alkoxylated fatty amine (b) is from 1:1 to 3:1.

(12) The corrosion inhibitor composition of any one of (1) to (11), wherein a weight ratio of the cinnamaldehyde compound (a) to the imidazoline compound (c) is from 1:5 to 100:1.

(13) The corrosion inhibitor composition of any one of (1) to (12), wherein a weight ratio of the cinnamaldehyde compound (a) to the imidazoline compound (c) is from 1:2 to 35:1.

(14) The corrosion inhibitor composition of any one of (1) to (13), wherein a weight ratio of the cinnamaldehyde compound (a) to the imidazoline compound (c) is from 1:1 to 5:1.

(15) The corrosion inhibitor composition of any one of (1) to (14), wherein a weight ratio of the alkoxylated fatty amine (b) to the imidazoline compound (c) is from 1:5 to 15:1.

(16) The corrosion inhibitor composition of any one of (1) to (15), wherein a weight ratio of the alkoxylated fatty amine (b) to the imidazoline compound (c) is from 1:2 to 4:1.

(17) The corrosion inhibitor composition of any one of (1) to (16), which comprises, relative to a total weight of the corrosion inhibitor composition:
 (a) 5 to 50 wt. % of the cinnamaldehyde compound;
 (b) 1 to 30 wt. % of the alkoxylated fatty amine; and
 (c) 0.1 to 25 wt. % of the imidazoline compound.

(18) The corrosion inhibitor composition of any one of (1) to (17), further comprising (d) a surfactant.

(19) The corrosion inhibitor composition of (18), wherein the surfactant (d) is a quaternary ammonium compound.

(20) The corrosion inhibitor composition of (19), wherein the quaternary ammonium compound is a chloride, bromide, or methosulfate salt of at least one cation selected from the group consisting of a $C_6$-$C_{22}$ alkyl trimethyl ammonium cation, a di-$C_6$-$C_{22}$ alkyl dimethyl ammonium cation, a $C_6$-$C_{22}$ alkyl benzyl dimethyl ammonium cation, a quaternized $C_6$-$C_{22}$ alkyl alkylene polyamine ammonium cation, and an N—$C_6$-$C_{22}$ alkyl ammonium cation of a heteroarene.

(21) The corrosion inhibitor composition of (18), wherein the surfactant (d) is an alkoxylated $C_1$-$C_{22}$ alkanol.

(22) The corrosion inhibitor composition of (21), wherein the alkoxylated $C_1$-$C_{22}$ alkanol is an ethoxylated $C_1$-$C_{22}$ alkanol.

(23) The corrosion inhibitor composition of (22), wherein the ethoxylated $C_1$-$C_{22}$ alkanol is an ethoxylated $C_8$-$C_{14}$ alkanol.

(24) The corrosion inhibitor composition of any one of (18) to (23), which comprises 0.1 to 25 wt. % of the surfactant (d), relative to a total weight of the corrosion inhibitor composition.

(25) The corrosion inhibitor composition of any one of (1) to (24), further comprising (e) a solvent.

(26) The corrosion inhibitor compositions of (25), wherein the solvent (e) is at least one selected from the group consisting of water, a polar aprotic solvent, an aromatic solvent, a terpineol, an alcohol with 1 to 18 carbon atoms, a carboxylic acid with 1 to 5 carbon atoms, and a polyol with 2 to 18 carbon atoms.

(27) The corrosion inhibitor composition of (25) or (26), wherein the solvent (e) is at least one selected from the group consisting of water, ethylene glycol methyl ether, ethylene glycol propyl ether, ethylene glycol butyl ether, formamide, dimethyl formamide, dimethyl acetamide, methanol, ethanol, propanol, isopropanol, n-butanol, isobutanol, n-pentanol, 2-ethyl-1-hexanol, ethylene glycol, diethylene glycol, triethylene glycol, tetraethylene glycol, 1,4-butanediol, 1,6-hexanediol, 2-butoxyethanol, and glycerol.

(28) The corrosion inhibitor composition of any one of (25) to (27), which comprises 10 to 90 wt. % of the solvent (e), relative to a total weight of the corrosion inhibitor composition.

(29) A method of inhibiting corrosion of metal in contact with an acidic medium in an oil or gas field environment, the method comprising:
 introducing a corrosion inhibitor composition of (1) into the acidic medium.

(30) The method of (29), wherein the corrosion inhibitor composition is introduced into the acidic medium during stimulation of an oil or gas well.

(31) The method of (29) or (30), wherein the acidic medium comprises HCl.

(32) The method of any one of (29) to (31), wherein the acidic medium comprises 10 to 20 wt. % HCl.

(33) The method of (31) or (32), wherein the acidic medium further comprises at least one selected from the group consisting of carbon dioxide, hydrogen sulfide, and brine.

(34) The method of any one of (29) to (33), wherein the acidic medium has a pH of less than 3.

(35) The method of any one of (29) to (34), wherein the corrosion inhibitor composition is introduced into the acidic medium at a concentration of 0.5 to 12 gpt.

(36) The method of any one of (29) to (35), wherein the corrosion inhibitor composition inhibits corrosion of the metal at a temperature of 60 to 180° C.

(37) The method of any one of (29) to (36), further comprising introducing an intensifier into the acidic medium.

(38) The method of (37), wherein the intensifier is at least one selected from the group consisting of CuI, KI, and formic acid.

(39) The method of (37) or (38), wherein the intensifier is CuI or KI.

(40) The method of (39), wherein the intensifier is introduced into the acidic medium at a concentration of 0.5 to 50 ppt.

(41) The method of (37) or (38), wherein the intensifier is formic acid.

(42) The method of (41), wherein the intensifier is introduced into the acidic medium at a concentration of 1 to 200 gpt.

(43) The method of any one of (29) to (42), wherein the corrosion rate of the metal is less than 0.05 pounds per square foot per hour (lbs/ft$^2$·h).

(44) The method of any one of (29) to (43), wherein the corrosion rate of the metal is less than 0.03 pounds per square foot per hour (lbs/ft$^2$·h).

The foregoing paragraphs have been provided by way of general introduction, and are not intended to limit the scope of the following claims. The described embodiments, together with further advantages, will be best understood by reference to the following detailed description.

DETAILED DESCRIPTION OF THE INVENTION

In the following description, it is understood that other embodiments may be utilized and structural and operational changes may be made without departure from the scope of the present embodiments disclosed herein.

Definitions

As used herein, the term "fatty" describes a compound with a long-chain (linear) hydrophobic portion made up of hydrogen and anywhere from 6 to 26 carbon atoms, which may be fully saturated or partially unsaturated, and optionally attached to a polar functional group such as a hydroxyl group, an amine group, or a carboxyl group (e.g., carboxylic acid). Fatty alcohols, fatty amines, fatty acids, fatty esters, and fatty amides are examples of materials which contain a fatty portion, and are thus considered "fatty" compounds herein. For example, stearic acid, which has 18 carbons total (a fatty portion with 17 carbon atoms and 1 carbon atom from the —COOH group), is considered to be a fatty acid having 18 carbon atoms herein.

As used herein, "alkoxylated" or "alkoxylate" refers to compounds containing a (poly)ether group (i.e., (poly)oxyalkylene group) derived from reaction with, oligomerization of, or polymerization of one or more alkylene oxides having 2 to 4 carbon atoms, and specifically includes (poly)oxyethylene (derived from ethylene oxide), (poly)oxypropylene (derived from propylene oxide), and (poly)oxybutylene (derived from butylene oxide), as well as mixtures thereof.

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed.

As used herein, the terms "optional" or "optionally" means that the subsequently described event(s) can or cannot occur or the subsequently described component(s) may or may not be present (e.g., 0 wt. %).

The term "alkyl", as used herein, unless otherwise specified, refers to a straight, branched, or cyclic, aliphatic fragment having 1 to 26 carbon atoms, preferably 8 to 22, and more preferably 12 to 18. Non-limiting examples include, but are not limited to, methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl, lauryl, myristyl, cetyl, stearyl, and the like, including guerbet-type alkyl groups (e.g., 2-methylpentyl, 2-ethylhexyl, 2-proylheptyl, 2-butyloctyl, 2-pentylnonyl, 2-hexyldecyl, 2-heptylundecyl, 2-octyldodecyl, 2-nonyltridecyl, 2-decyltetradecyl, and 2-undecylpentadecyl), and unsaturated alkenyl and alkynyl variants such as vinyl, allyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, 5-hexenyl, oleyl, linoleyl, and the like. Cycloalkyl is a type of cyclized alkyl group. Exemplary cycloalkyl groups include, but are not limited to, cyclopropyl, cyclobutyl, cyclopentyl, cyclohexyl, norbornyl, and adamantyl. The term "lower alkyl" is used herein to describe alkyl groups having 1 to 5 carbon atoms (e.g., methyl, ethyl, n-propyl, etc.).

As used herein, unless otherwise specified, the term "aryl" refers to an aromatic group containing only carbon in the aromatic ring(s), such as phenyl, biphenyl, naphthyl, anthracenyl, and the like. The term "heteroarene" or "heteroaryl" refers to an arene compound or aryl group where at least one carbon atom is replaced with a heteroatom (e.g., nitrogen, oxygen, sulfur) and includes, but is not limited to, pyridine, pyrimidine, quinoline, isoquinoline, pyrazine, pyridazine, indole, pyrrole, oxazole, furan, benzofuran, thiophene, benzothiophene, isoxazole, pyrazole, triazole, tetrazole, indazole, purine, carbazole, imidazole, and benzimidazole.

"Aroyl" refers to aryl carbonyl (arylC(O)—) substituents, such as benzoyl and naphthoyl while "alkanoyl" refers to alkyl variants (alkylC(O)—), where the alkyl group is bound to a carbon that is attached to an oxygen atom through a double bond. Examples of alkanoyl substitution includes, acetyl, propionyl, butyryl, isobutyryl, pivaloyl, valeryl, hexanoyl, octanoyl, lauroyl, and stearoyl. As used herein, "alkanoyloxy" groups are alkanoyl groups that are bound to oxygen (—O—C(O)-alkyl), for example, acetyloxy, propionyloxy, butyryloxy, isobutyryloxy, pivaloyloxy, valeryloxy, hexanoyloxy, octanoyloxy, lauroyloxy, and stearoyloxy. "Alkoxycarbonyl" substituents are alkoxy groups bound to C=O (e.g. —C(O)—Oalkyl), for example methyl ester, ethyl ester, and pivaloyl ester substitution where the carbonyl functionality is bound to the rest of the compound.

As used herein, "optionally substituted" means that at least one hydrogen atom is replaced with a non-hydrogen group, provided that normal valencies are maintained and that the substitution results in a stable compound. Such optional substituents may include, but are not limited to, aryl, alkoxy, aryloxy, arylalkyloxy, aroyl, alkanoyl, alkanoyloxy, carboxy, alkoxycarbonyl, hydroxy, halo (e.g. chlorine, bromine, fluorine or iodine), amino (e.g. alkylamino, arylamino, arylalkylamino, alkanoylamino, either mono- or disubstituted), oxo, amido (e.g. —CONH$_2$, —CONHalkyl, —CONHaryl, —CONHarylalkyl or cases where there are two substituents on one nitrogen), and the like.

As used herein the term "corrosion inhibitor" refers to a substance(s) that prevents or reduces the deterioration of a metal surface by oxidation or other chemical reaction. Corrosive substances that can cause corrosion, particularly of metal surfaces of equipment used during stimulation operations, include water with high salt contents, acidic inorganic compounds such as hydrochloric acid, hydrofluoric acid, carbon dioxide ($CO_2$) and/or hydrogen sulfide ($H_2S$), natural organic acids, and microorganisms. Preferred corrosion inhibitor compositions of the present invention reduce, inhibit and/or prevent the destructive effect such substances have on various metal surfaces.

Corrosion Inhibitor Compositions

The present disclosure provides corrosion inhibitor compositions that generally include a combination of (a) a cinnamaldehyde compound, (b) an alkoxylated fatty amine, and (c) an imidazoline compound, and optionally (d) a surfactant, (e) a solvent, and (f) an additive. The combination of components (a)-(c), particularly in the described ratios, provides a superior anticorrosion effect that enables their use in strongly acidic conditions such as during acid stimulation in oil or gas fields, and in low dosages.

(a) Cinnamaldehyde Compound

The cinnamaldehyde compound employed in the present disclosure generally contains an optionally substituted aryl group separated from aldehyde moiety (or a functional group mimic, protecting group, or isostere thereof) by one unsaturated carbon-carbon double bond or a two or more unsaturated carbon-carbon double bonds in conjugation (i.e., polyene moiety), the simplest of which is cinnamaldehyde (i.e., 3-phenyl-2-propen-1-al, $C_6H_5CH=CHCHO$), which may be obtained naturally from cinnamon oil. The double bond(s) that link, and are in conjugation with, the aryl group and the aldehyde moiety causes the geometry of such compounds to be planar and, therefore, cis and/or trans isomers may be present. In preferred embodiments, the cinnamaldehyde compound employed in the corrosion inhibitor compositions herein has a trans-configuration or when a mixture of isomers is present, a majority of the double bonds exist in the trans-isomer configuration. In this context, "majority" means that if the cinnamaldehyde compound contains a mixture of isomers, the trans-configuration is present in a proportion greater than 50 wt. %, preferably greater than 60 wt. %, preferably greater than 70 wt. %, preferably greater than 80 wt. %, preferably greater than 90 wt. %, preferably greater than 95 wt. % of said mixture.

In preferred embodiments, the cinnamaldehyde compound is of formula I

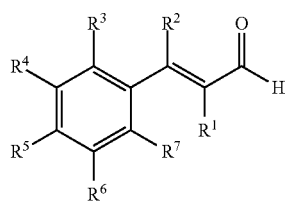

(I)

wherein:

$R^1$ and $R^2$ are independently hydrogen, an optionally substituted alkyl, an optionally substituted aryl, an optionally substituted alkoxy, or a halo, preferably a hydrogen, an optionally substituted $C_1$-$C_6$ alkyl, or a halo, more preferably a hydrogen, or methyl;

$R^3$ to $R^7$ are independently hydrogen, an optionally substituted alkyl, an optionally substituted aryl, an optionally substituted alkoxy, an optionally substituted aroyl, an optionally substituted alkanoyl, an optionally substituted alkanoyloxy, a carboxy, an optionally substituted alkoxycarbonyl, a hydroxy, a halo, an amino group of the formula —$NH_2$, —$NHR_a$, or —$N(R_a)_2$, an alkyl ammonium salt of the formula —$(N(R_a)^+$, a nitro, a cyano, a sulfate anion, an alkylsulfate, a thiocyano, an optionally substituted alkylthio, an optionally substituted alkylsulfonyl, an optionally substituted arylsulfonyl, or an optionally substituted sulfonamido (e.g., —$SO_2NH_2$), or wherein two of these adjacent substituents represented by $R^3$, $R^4$, $R^5$, $R^6$ or $R^7$, together form a methylene dioxy group, preferably $R^3$ to $R^7$ are independently hydrogen, an optionally substituted $C_1$-$C_6$ alkyl, an optionally substituted $C_1$-$C_4$ alkoxy, nitro, or a halo; and each $R_a$ is independently an optionally substituted alkyl or an optionally substituted aryl group.

Examples of cinnamaldehyde compounds that can be used herein include, but are not limited to, cinnamaldehyde (i.e., $R^1$ to $R^7$ are each hydrogen), 3,3'-(1,4-phenylene)diacrylaldehyde, p-hydroxycinnamaldehyde, p-methylcinnamaldehyde, p-ethylcinnamaldehyde, p-methoxycinnamaldehyde, 2,4,5-trimethoxycinnamaldehyde, 3,4,5-trimethoxycinnamaldehyde, 3,4-dimethoxycinnamaldehyde, 1-ethoxy-2-acetoxycinnamaldehyde, 1-ethoxy-2-hydroxycinnamaldehyde, sinapaldehyde, 2,5-dimethoxy-3,4-methylenedioxycinnamaldehyde, 2-methoxy-4,5-methylenedioxy cinnamaldehyde, coniferyl aldehyde, 2,3-dimethoxy-4,5-methylenedioxycinnamaldehyde, p-dimethylaminocinnamaldehyde, p-diethylaminocinnamaldehyde, p-nitrocinnamaldehyde, o-nitrocinnamaldehyde, 3,4-methylenedioxycinnamaldehyde, sodium p-sulfocinnamaldehyde, p-trimethylammoniumcinnamaldehyde sulfate, p-trimethylammoniumcinnamaldehyde o-methylsulfate, p-thiocyanocinnamaldehyde, p-chlorocinnamaldehyde, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, α-bromo-p-cyanocinnamaldehyde, α-ethyl-p-methylcinnamaldehyde, and p-methyl-α-pentylcinnamaldehyde, as well as mixtures thereof. In more preferred embodiments, the cinnamaldehyde compound employed in the corrosion inhibitor composition is cinnamaldehyde.

Other cinnamaldehyde analogs that may be used herein include, but are not limited to, $C_1$-$C_{12}$ alkyl acetals or hemiacetals of any cinnamaldehyde compound previously listed (e.g., cinnamaldehyde dimethyl acetal), oxime variants of any cinnamaldehyde compound previously listed (e.g., cinnamaloxime), nitrile variants of an cinnamaldehyde compound previously listed (e.g., cinnamonitrile), or polyene variants of any cinnamaldehyde previously listed (e.g., 5-phenyl-2,4-pentadienal and 7-phenyl-2,4,6-heptatrienal).

In some embodiments, the cinnamaldehyde compound is present in the corrosion inhibitor composition in amounts of at least 5 wt. %, preferably more than 10 wt. %, preferably at least 15 wt. %, preferably at least 20 wt. %, preferably at least 25 wt. %, and up to 50 wt. %, preferably up to 45 wt. %, preferably less than 40 wt. %, preferably up to 35 wt. %, preferably up to 30 wt. %, relative to a total weight of the corrosion inhibitor composition. Without being bound by theory, the cinnamaldehyde compound herein may inhibit corrosion caused by acidic mediums by undergoing an acid catalyzed polymerization reaction thereby forming a thin film on the metal surface being protected.

(b) Alkoxylated Fatty Amine

The corrosion inhibitor compositions of the present disclosure also generally include one or more alkoxylated fatty amines, that is, a polyoxyalkylene ether of a fatty amine. Fatty amines are compounds having a long-chain alkyl group made up of hydrogen and anywhere from 6 to 26 carbon atoms, preferably 8 to 22 carbon atoms, preferably 12 to 20 carbon atoms, more preferably 16 to 18 carbon atoms, bonded to an amine functional group. The fatty portion of the fatty amine may be saturated or may contain sites of unsaturation, for example, the fatty portion may be mono-, di-, tri-, oligo-, or poly-unsaturated. The fatty portion of the fatty amine preferably contains sites of unsaturation from the point of view of solubility. The site(s) of unsaturation may be cis-double bonds, trans-double bonds, or a combination. The fatty amines may be derivable from fatty acids, for example by subjecting a fatty acid, either a synthetic fatty acid or a naturally occurring fatty acid, to the Nitrile process followed by reduction (e.g., hydrogenation), which is known by those of ordinary skill in the art. Exemplary fatty acid starting materials that may be used to make the fatty amine include, for example, caprylic acid, capric acid, lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-inolenic acid, arachidonic acid, eicosapentaenoic acid, erucic acid, docosahexaenoic acid, and the like, as well as fatty acid mixtures (natural or synthetic mixtures) such as tall oil fatty acid and its derivatives (TOFA), coconut oil and its derivatives, tallow fatty acid and its derivatives (tallow), naphthenic acids and its derivatives, soya fatty acid and its derivatives (soya), and the like. Therefore, the fatty amines may also exist as a distribution or mixture of fatty amines when derived from mixtures of (naturally occurring) fatty acids. Exemplary fatty amines derivable or manufactured from fatty acids, include, but are not limited to, coco amine, stearyl amine, palmitoleylamine, oleylamine, tallow amine (e.g., Farmin TD, commercially available from Kao), tall oil fatty acid amine, laurylamine, linoleylamine, myristylamine, cetylamine, stearylamine, and soya amine, any of which may be optionally hydrogenated, partially hydrogenated, or non-hydrogenated.

The fatty amine may be a fatty monoamine, such as primary fatty amines (R—NH$_2$), and secondary di-fatty amines (R$_2$—NH), or fatty lower alkyl (e.g., methyl) amines (R—NH—CH$_3$); or a fatty (poly)alkylene polyamine, such as fatty ethylene diamines (R—NH—(CH$_2$)$_2$—NH$_2$), fatty ethylene triamines (linear or branched, R—NH—(CH$_2$)$_2$—NH—(CH$_2$)$_2$—NH$_2$), fatty ethylene tetramines (linear or branched, R—NH—(CH$_2$)$_2$—NH—(CH$_2$)$_2$—NH—(CH$_2$)$_2$—NH$_2$), fatty propylene diamines (R—NH—(CH$_2$)$_3$—NH$_2$), fatty propylene triamines (linear or branched, R—NH—(CH$_2$)$_3$—NH—(CH$_2$)$_3$—NH$_2$), and fatty propylene tetramines (linear or branched, R—NH—(CH$_2$)$_3$—NH—(CH$_2$)$_3$—NH—(CH$_2$)$_3$—NH$_2$.

Any of the aforementioned fatty amines may be alkoxylated to provide the alkoxylated fatty amines useful in the corrosion inhibitor compositions of the present disclosure. Primary fatty amines may be alkoxylated with one or two polyoxyalkylene ether groups (i.e., mono- or bis-alkoxylated), and secondary fatty amines may be alkoxylated with one polyoxyalkylene ether group (i.e., mono-alkoxylated). The (poly)oxyalkylene groups may include polyoxyethylene (—O—(CH$_2$—CH$_2$—O)$_m$—R$_b$), polyoxypropylene (—O—(CH$_2$—CH(CH$_3$)—O)$_m$—R$_b$), and polyoxybutylene (—O—(CH$_2$—CH(CH$_2$CH$_3$)—O)$_m$—R$_b$) groups having up to 100 repeating units, i.e., m is from 1 to 100, and wherein R$_b$ is H or a lower alkyl group, preferably H or a C$_1$ to C$_3$ alkyl group (e.g., methyl, ethyl, n-propyl, isopropyl), more preferably H.

In preferred embodiments, the alkoxylated fatty amine is an alkoxylated fatty monoamine of formula II, an alkoxylated fatty alkylene diamine of formula III, or an alkoxylated fatty alkylene triamine of formula IVa or IVb (branched or linear):

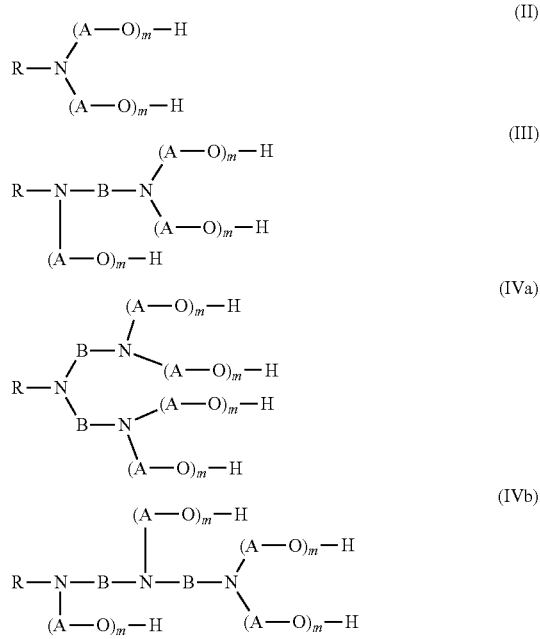

wherein:
R is an alkyl group made up of hydrogen and anywhere from 6 to 26 carbon atoms, preferably 8 to 22 carbon atoms, preferably 12 to 20 carbon atoms, more preferably 16 to 18 carbon atoms (e.g., octadecyl), including mixtures thereof, and more preferably contains at least one site of unsaturation, more preferably at least two sites of unsaturation;

A is an ethylene group (—CH$_2$CH$_2$—), a propylene group (—CH$_2$CH(CH$_3$)—), or a butylene group (—CH$_2$CH(CH$_2$CH$_3$)—), preferably an ethylene group;

B is a ethylene spacer (—CH$_2$CH$_2$—) or a n-propylene spacer (—CH$_2$CH$_2$CH$_2$—); and each m is independently a positive integer from 1 to 100, preferably 1 to 80, more preferably 1 to 60, more preferably 1 to 50, more preferably 1 to 40, more preferably 1 to 20, more preferably 1 to 10, more preferably 1 to 5.

In preferred embodiments, R is a mixture of long-chain alkyl groups derived from naturally occurring fatty acid mixtures such as tall oil fatty acid and its derivatives (TOFA), coconut oil and its derivatives, tallow fatty acid and its derivatives (tallow), naphthenic acids and its derivatives, soya fatty acid and its derivatives (soya), and the like. Therefore, in preferred embodiments, the alkoxylated fatty amine is a coconut amine alkoxylate, a stearyl amine alkoxylate, a palmitoleylamine alkoxylate, a oleylamine alkoxylate, a tallow amine alkoxylate, a tall oil amine alkoxylate, a laurylamine alkoxylate, a myristylamine alkoxylate, a cetylamine alkoxylate, a stearylamine alkoxylate, a linoleyl amine alkoxylate, a soya amine alkoxylate, as well as alkoxylated ethylene diamine variants thereof (formula III, where B is an ethylene spacer), alkoxylated trimethylene diamine variants thereof (formula III, where B is an n-propylene spacer, for example, tallow alkyltrimethylene diamine alkoxylates), alkoxylated diethylene triamine variants thereof (formula IVa or IVb, where B is an ethylene spacer), and alkoxylated dipropylene triamine variants thereof (formula IVa or IVb, where B is an n-propylene spacer). More preferably, the alkoxylated fatty amine is a tallow amine alkoxylate. Even more preferably, the alkoxylated fatty amine is a coconut amine ethoxylate, a stearyl amine ethoxylate, a palmitoleylamine ethoxylate, a oleylamine ethoxylate, a tallow amine ethoxylate, a tall oil amine ethoxylate, a laurylamine ethoxylate, a myristylamine ethoxylate, a cetylamine ethoxylate, a stearylamine ethoxylate, a linoleyl amine ethoxylate, a soya amine ethoxylate, as well as ethoxylated ethylene diamine variants thereof (formula III, where B is an ethylene spacer and A is an ethylene group), ethoxylated trimethylene diamine variants thereof (formula III, where B is an n-propylene spacer and A is an ethylene group, for example, tallow alkyltrimethylene diamine ethoxylates), ethoxylated diethylene triamine variants thereof (formula IVa or IVb, where B is an ethylene spacer and A is an ethylene group), and ethoxylated dipropylene triamine variants thereof (formula IVa or IVb, where B is an n-propylene spacer and A is an ethylene group). More preferably, the alkoxylated fatty amine is a tallow amine ethoxylate. Yet even more preferably, the alkoxylated fatty amine is any of the above ethoxylates using 2 to 30 EO molar equivalents, preferably 3 to 15 EO molar equivalents, preferably 4 to 10 EO molar equivalents, preferably 5 to 8 EO molar equivalents per moles of amine starting material, for example, Amiet 102, Amiet 105, Amiet 302, Amiet 308, Amiet 320, Amiet 502, Amiet 505, and Amiet 515 (each available from Kao).

In some embodiments, the alkoxylated fatty amine (b) is present in the corrosion inhibitor composition in amounts of at least 1 wt. %, preferably at least 3 wt. %, preferably at least 5 wt. %, preferably at least 7 wt. %, preferably at least 10 wt. %, and up to 30 wt. %, preferably up to 25 wt. %, preferably up to 20 wt. %, preferably up to 15 wt. %, relative to a total weight of the corrosion inhibitor composition.

(c) Imidazoline Compound

The corrosion inhibitor compositions of the present disclosure also generally include one or more imidazoline compounds. Imidazoline compounds are generally formed from a reaction between (i) a fatty acid or an ester derivative thereof, for example a $C_1$ to $C_{12}$ alkyl ester (e.g., methyl, ethyl, etc.) of a fatty acid or a glycerol ester of a fatty acid, and (ii) a polyamine which contains at least one ethylene diamine group (i.e., a polyamine containing at least one vicinal diamine). The imidazoline compound may be a non-ionic cyclization reaction product from reaction between (i) and (ii), or the imidazoline compound may be a modified imidazoline (cationic or amphoteric). Examples of cationic imidazolines include those non-ionic cyclization products which are further protonated by reaction with an acid or alkylated forming quaternary ammonium functional groups. Examples of amphoteric imidazolines include betaine-type imidazolines. Preferably, the imidazoline compound used herein is non-ionic or cationic. More preferably the imidazoline compound is non-ionic.

For raw material (i), any previously described fatty acid or naturally occurring mixture of fatty acids or their respective ester derivatives, can be used. In some embodiments, the imidazoline compound is prepared from tall oil fatty acid, coconut oil fatty acid, tallow fatty acid, soya fatty acid, and oleic acid. In preferred embodiments, the imidazoline compound is formed from tall oil fatty acid as raw material (i).

For raw material (ii), the polyamine may be a compound containing two, three, four, or more nitrogen groups, which may be primary, secondary, or tertiary amines, so long as at least one ethylene diamine group is present that is capable of reacting with a carboxylic acid group to form an imidazoline structure. While the polyamine may be cyclic, in preferred embodiments the polyamine is an acyclic compound. Suitable polyamines include, but are not limited to, ethylene diamine, β-hydroxyethyl ethylene diamine, 1,2-diaminopropane, 1,2-diaminocyclohexane, 2,3-diaminobutane, 2,3-diaminobutan-1-ol, propane-1,2,3-triamine, tris(2-aminoethyl)amine, as well as polyethylene polyamine compounds of formula V:

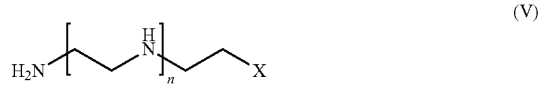

(V)

wherein n is a positive integer from 1 to 10, preferably from 1 to 8, preferably from 2 to 6, and X is —$NH_2$ or —OH. Suitable examples of polyethyelene polyamines include, but are not limited to, tetraethylenepentamine (TEPA), diethylenetriamine (DETA), triethylentetramine (TETA), aminoethylethanolamine (AEEA), pentaethylene hexamine (PEHA), hexaethylene heptamine (HEHA), as well as higher homologs, as well as mixtures of polyethylene polyamines, including, but not limited to, Ethyleneamine E-100, a commercially available mixture of polyethylene polyamines comprising TEPA, PEHA, and HEHA (Huntsman Corporation); Heavy Polyamine X (HPA-X), a commercially available mixture of linear, branched, and cyclic polyethylene polyamines comprising TETA, TEPA, PEHA, and higher polyethylene polyamines from Dow Chemical Company; and Amix 1000 (CAS #68910-05-4), a commercially available mixture of roughly equivalent amounts of aminoethylethanolamine, triethylene tetramine (TETA), aminoethylpiperazine, and high boiling polyamines from BASF Corporation. In preferred embodiments, the polyamine (ii) used to make the imidazoline compound (c) herein is diethylenetriamine (DETA) or aminoethylethanolamine (AEEA).

The resulting imidazoline product formed from the reaction between equal moles of (i) the fatty acid or an ester derivative and (ii) the polyamine may be preferably represented by formula VI:

(VI)

wherein:
R is an alkyl group made up of hydrogen and anywhere from 6 to 26 carbon atoms, preferably 8 to 22 carbon atoms, preferably 12 to 20 carbon atoms, more preferably 16 to 18 carbon atoms, including mixtures thereof, and more preferably is selected from linear alkyl, mono-unsaturated alkenyl, di-unsaturated alkenyl, tri-unsaturated alkenyl, and oligo-unsaturated alkenyl;
$R^8$ is —$(CH_2CH_2NH)_n$—$CH_2CH_2X$;
X is —$NH_2$ or —OH; and
n is 0 to 4.

In some embodiments, when the polyamine (ii) contains two or more ethylene diamine groups capable of reacting with a carboxylic acid to form an imidazoline compound product, different molar ratios of fatty acid to polyamine may be employed, and the resulting product may contain one or more imidazoline structures per product molecule. A wide range of molar ratios of (i) and (ii) may be employed to form the imidazoline compounds herein, however, in preferred embodiments the molar ratio of (i) to (ii) is 1:5 to 5:1, preferably 1:1 to 5:1, more preferably 2:1 to 4:1, or any integers or non-integers in between. Imidazoline compounds that may be used in the corrosion inhibitor compositions herein may include, but is not limited to, 1:1 (molar ratio) TOFA/DETA imidazoline, 2:1 TOFA/DETA imidazoline, 1:1 TOFA/TETA, imidazoline, 2:1 TOFA/TETA imidazoline, 2:1 TOFA/TETA bis-imidazoline, 1:1 TOFA/TEPA imidazoline, 2:1 TOFA/TEPA imidazoline, 2:1 TOFA/TEPA bis-imidazoline, 3:1 TOFA/TEPA bis-imidazoline, 1:1 TOFA/AEEA imidazoline, 2:1 TOFA/AEEA imidazoline, 1:1 TOFA/polyamine imidazoline, 2:1 TOFA/polyamine imidazoline, 2:1 TOFA/polyamine bis-imidazoline, 3:1 TOFA/TEPA polyamine bis-imidazoline, 1:1 Soya/DETA imidazoline, 2:1 Soya/DETA imidazoline, 1:1 Soya/TETA imidazoline, 2:1 Soya/TETA imidazoline, 2:1 Soya/TETA bis-imidazoline, 1:1 Soya/TEPA imidazoline, 2:1 Soya/TEPA imidazoline, 2:1 Soya/TEPA bis-imidazoline, 3:1 TOFA/TEPA bis-imidazoline, 1:1 Soya/AEEA imidazoline, 2:1 Soya/AEEA imidazoline, 1:1 Soya/polyamine imidazoline, 2:1 Soya/polyamine imidazoline, 2:1 Soya/polyamine bis-imidazoline, 1:1 Tallow/DETA imidazoline, 2:1 Tallow/DETA imidazoline, 1:1 Tallow/TETA imidazoline, 2:1 Tallow/TETA imidazoline, 2:1 Tallow/TETA bis-imidazoline, 1:1 Tallow/TEPA imidazoline, 2:1 Tallow/TEPA imidazoline, 2:1 Tallow/TEPA bis-imidazoline, 3:1 Tallow/TEPA bis-imidazoline, 1:1 Tallow/AEEA imidazoline, 2:1 Tallow/AEEA imidazoline, 1:1 Tallow/polyamine imidazoline, 2:1

Tallow/polyamine imidazoline, 2:1 Tallow/polyamine bis-imidazoline, 3:1 Tallow/TEPA polyamine bis-imidazoline, as well as mixtures thereof. In preferred embodiments, the imidazoline is 1:1 TOFA-DETA imidazoline or 1:1 TOFA-AEEA.

In some embodiments, the imidazoline compound (c) is present in the corrosion inhibitor composition in amounts of at least 0.1 wt. %, preferably at least 1 wt. %, preferably at least 2 wt. %, preferably at least 3 wt. %, preferably at least 4 wt. %, preferably at least 5 wt. %, and up to 25 wt. %, preferably up to 20 wt. %, preferably up to 15 wt. %, preferably up to 10 wt. %, relative to a total weight of the corrosion inhibitor composition.

In some embodiments, the reaction between (i) a fatty acid or an ester derivative thereof, and (ii) a polyamine which contains at least one ethylene diamine group, as described above, does not undergo complete intramolecular cyclization/condensation via a pendent vicinal amine moiety to form only the imidazoline compound, and instead some material stops at the amide forming step to produce a fatty amidoamine byproduct (c1). The resulting fatty amidoamine byproduct (c1) formed from the reaction between equal moles of (i) the fatty acid or an ester derivative and (ii) the polyamine may be preferably represented by formula VII:

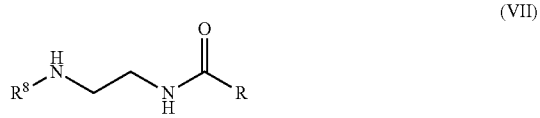

(VII)

wherein:
R is an alkyl group made up of hydrogen and anywhere from 6 to 26 carbon atoms, preferably 8 to 22 carbon atoms, preferably 12 to 20 carbon atoms, more preferably 16 to 18 carbon atoms, including mixtures thereof, and more preferably is selected from linear alkyl, mono-unsaturated alkenyl, di-unsaturated alkenyl, tri-unsaturated alkenyl, and oligo-unsaturated alkenyl;
$R^8$ is —$(CH_2CH_2NH)_n$—$CH_2CH_2X$);
X is —$NH_2$ or —OH; and
n is 0 to 4.

Each of the cinnamaldehyde compound (a), the alkoxylated fatty amine (b), and the imidazoline compound (c) components in the corrosion inhibitor compositions herein are thought to inhibit corrosion of metal through film forming mechanisms. In view of this, it has been surprisingly found that particular ratios of components (a), (b), and (c) provide superior anti-corrosion activity in strongly acidic mediums.

In some embodiments, the weight ratio of the cinnamaldehyde compound (a) to the alkoxylated fatty amine (b) is from 1:6, preferably from 1:5, preferably from 1:4, preferably from 1:3, preferably from 1:2, preferably from 1:1, and up to 50:1, preferably up to 30:1, preferably up to 20:1, preferably up to 15:1, preferably up to 10:1, preferably up to 5:1, preferably up to 3:1.

In some embodiments, the weight ratio of the cinnamaldehyde compound (a) to the the imidazoline compound (c) is from 1:5, preferably from 1:4, preferably from 1:3, preferably from 1:2, preferably from 1:1, and up to 100:1, preferably up to 50:1, preferably up to 35:1, preferably up to 20:1, preferably up to 15:1, preferably up to 10:1, preferably up to 5:1.

In some embodiments, the weight ratio the alkoxylated fatty amine (b) to the the imidazoline compound (c) is from 1:5, preferably from 1:4, preferably from 1:3, preferably from 1:2, preferably from 1:1, and up to 15:1, preferably up to 10:1, preferably up to 8:1, preferably up to 6:1, preferably up to 4:1, preferably up to 3:1.

In some embodiments, the corrosion inhibitor compositions herein have a total weight percent of active components, that is, the sum of cinnamaldehyde compound (a), the alkoxylated fatty amine (b), and the imidazoline compound (c) (a+b+c) of at least 25 wt. %, preferably at least 30 wt. %, preferably at least 35 wt. %, preferably at least 40 wt. %, preferably at least 45 wt. %, preferably at least 50 wt. %, preferably at least 55 wt. %, for example 40-80 wt. %, 45-70 wt. %, or 50-55 wt. %.

(d) Surfactant

The corrosion inhibitor composition may also optionally include one or more surfactants. The surfactant(s), when present, may be included in an amount of at least 0.1 wt. %, preferably at least 0.5 wt. %, preferably at least 1 wt. %, preferably at least 2 wt. %, preferably at least 3 wt. %, preferably at least 4 wt. %, preferably at least 5 wt. %, and up to 25 wt. %, preferably up to 20 wt. %, preferably up to 15 wt. %, preferably up to 10 wt. %, preferably up to 8 wt. %, preferably up to 6 wt. %, based on a total weight of the corrosion inhibitor compositions.

Cationic, non-ionic, and/or amphoteric surfactants may be employed herein. With respect to the surfactant description below, "R" is used to denote higher alkyl groups having 6 to 26 carbon atoms (e.g., "$C_6$-$C_{26}$ alkyl"), preferably 8 to 22 carbon atoms, preferably 12 to 20 carbon atoms, more preferably 16 to 18 carbon atoms, which may be a fatty group (i.e., linear aliphatic groups with optional sites of unsaturation) or a branched or cyclic alkyl group.

Cationic surfactants may include a protonated amine formed from a reaction between a $C_6$-$C_{26}$ alkyl amine compound and an acid, a protonated $C_6$-$C_{26}$ alkyl amidoamine formed from a reaction between a $C_6$-$C_{26}$ alkyl amidoamine compound and an acid, and/or a quaternary ammonium compound. In preferred embodiments, the surfactant (d) is a quaternary ammonium compound.

In some embodiments, the cationic surfactant is a protonated $C_6$-$C_{26}$ alkyl amine formed from a reaction between a $C_6$-$C_{26}$ alkyl amine compound and either an organic acid (e.g., acetic acid, formic acid, propionic acid, butyric acid, pentanoic acid, hexanoic acid, oxalic acid, malonic acid, lactic acid, glyceric acid, glycolic acid, malic acid, citric acid, benzoic acid, p-toluenesulfonic acid, trifluoromethanesulfonic acid, etc.) or an inorganic acid (e.g., hydrochloric acid, nitric acid, phosphoric acid, sulfuric acid, hydrobromic acid, perchloric acid, hydroiodic acid, etc.). The $C_6$-$C_{26}$ alkyl amine compounds reacted with the organic or inorganic acid may be primary, secondary or tertiary amines, with each $C_6$-$C_{26}$ alkyl group (represented by "R" below) present having 6 to 26 carbon atoms, preferably 8 to 22 carbon atoms, preferably 12 to 20 carbon atoms, more preferably 16 to 18 carbon atoms. In some embodiments, the $C_6$-$C_{26}$ alkyl group may be a fatty group (i.e., linear), which may be derived from any of the fatty acids listed previously, and in particular from the following fatty amines, coco amine, stearyl amine, palmitoleylamine, oleylamine, oleyldimethylamine, tallow amine, tall oil fatty acid amine, laurylamine, linoleylamine, myristylamine, cetylamine, stearylamine, and soya amine. The protonated $C_6$-$C_{26}$ alkyl amine may include protonated salts of:

$C_6$-$C_{26}$ alkyl monoamines, such as those formed from primary $C_6$-$C_{26}$ alkyl amines (R—$NH_2$), di-$C_6$-$C_{26}$ alkyl amines ($R_2$—NH), tri-$C_6$-$C_{26}$ alkyl amines ($R_3$—

N), $C_6$-$C_{26}$ alkyl dimethyl amines (R—N(CH$_3$)$_2$), and di-$C_6$-$C_{26}$ alkyl methyl amines (R$_2$—NCH$_3$);

$C_6$-$C_{26}$ alkyl (poly)alkylene polyamines, such as those formed from $C_6$-$C_{26}$ alkyl ethylene diamines (R—NH—(CH$_2$)$_2$—NH$_2$), $C_6$-$C_{26}$ alkyl ethylene triamines (linear or branched, R—NH—(CH$_2$)$_2$—NH—(CH$_2$)$_2$—NH$_2$), $C_6$-$C_{26}$ alkyl ethylene tetramines (linear or branched, R—NH—(CH$_2$)$_2$—NH—(CH$_2$)$_2$—NH—(CH$_2$)$_2$—NH$_2$), $C_6$-$C_{26}$ alkyl propylene diamines (R—NH—(CH$_2$)$_3$—NH$_2$), $C_6$-$C_{26}$ alkyl propylene triamines (linear or branched, R—NH—(CH$_2$)$_3$—NH—(CH$_2$)$_3$—NH$_2$), and $C_6$-$C_{26}$ alkyl propylene tetramines (linear or branched, R—NH—(CH$_2$)$_3$—NH—(CH$_2$)$_3$—NH—(CH$_2$)$_3$—NH$_2$); and alkoxylated fatty amines, such as protonated amine salts of any alkoxylated fatty amine described previously, including protonated versions of the alkoxylated monoamine, alkoxylated fatty alkylene diamine, and the alkoxylated fatty alkylene triamine compounds of formula II, III, and IVa/b, respectively.

In some embodiments, the cationic surfactant is a protonated $C_6$-$C_{26}$ alkyl amidoamine formed from reaction between a $C_6$-$C_{26}$ alkyl amidoamine and either an organic acid (e.g., acetic acid, formic acid, propionic acid, butyric acid, pentanoic acid, hexanoic acid, oxalic acid, malonic acid, lactic acid, glyceric acid, glycolic acid, malic acid, citric acid, benzoic acid, p-toluenesulfonic acid, trifluoromethanesulfonic acid, etc.) or an inorganic acid (e.g., hydrochloric acid, nitric acid, phosphoric acid, sulfuric acid, hydrobromic acid, perchloric acid, hydroiodic acid, etc.). In some embodiments, the $C_6$-$C_{26}$ alkyl amidoamine is a fatty amidoamine, which may be the amide reaction product between any fatty acid previously listed (or ester derivative thereof) with a polyamine. The polyamine may contain two, three, four, or more nitrogen groups, and may be an alkyl polyamine, where at least one of the nitrogen atoms present is directly bonded to at least one alkyl substituent. The amine groups may be primary, secondary, or tertiary amines, so long as at least one of the nitrogen groups is primary or secondary and capable of participating in amide bond formation, and the alkyl substituent(s), when present, may be linear, branched, saturated or unsaturated. While the polyamine may be cyclic, in preferred embodiments the polyamine is an acyclic compound. Suitable polyamines include, but are not limited to, diamines such as putrescine, cadaverine, ethylene diamine, N$^1$,N$^1$-dimethylethane-1,2-diamine, N$^1$,N$^1$-dimethylpropane-1,3-diamine, N$^1$,N$^1$-diethylethane-1,2-diamine, N$^1$,N$^1$-diethylpropane-1,3-diamine; triamines such as spermidine, 1,1,1-tris(aminomethyl)ethane; alkyl tetraamines such as tris(2-aminoethyl)amine and spermine; polyethylene polyamines such as those of formula V, for example, tetraethylenepentamine (TEPA), di ethylenetriamine (DETA), triethylentetramine (TETA), aminoethylethanolamine (AEEA), pentaethylene hexamine (PEHA), hexaethylene heptamine (HEHA), as well as higher homologs thereof; polypropylene polyamines such as dipropylene triamine, tripropylene tetramine, tetrapropylene pentamine, pentapropylene hexamine, hexapropylene heptamine, and higher homologues; and polybutylene polyamines such as dibutylene triamine, tributylene tetramine, tetrabutylene pentamine, pentabutylene hexamine, hexabutylene heptamine, and higher homologues.

Non-limiting examples of protonated $C_6$-$C_{26}$ alkyl amidoamines include, but are not limited to, protonated forms of stearamidopropyldimethylamine, stearamidopropyldiethylamine, stearamidoethyldiethylamine, stearamidoethyldimethylamine, palmitamidopropyldimethylamine, palmitamidopropyldiethylamine, palmitamidoethyldiethylamine, palmitamidoethyldimethylamine, behenamidopropyldimethylamine, behenamidopropyldiethylmine, behenamidoethyldiethylamine, behenamidoethyldimethylamine, arachidamidopropyldimethylamine, arachidamidopropyldiethylamine, arachidamidoethyldiethylamine, and arachidamidoethyldimethylamine.

In some embodiments, the cationic surfactant is a quaternary ammonium compound. The quaternary ammonium compounds may be those compounds made from alkylation with suitable alkylating agents (e.g., dimethyl sulfate, methyl chloride or bromide, benzyl chloride or bromide, $C_6$-$C_{26}$ alkyl chloride or bromide, etc.) of:

a tertiary $C_6$-$C_{26}$ alkyl amine such as a tri-$C_6$-$C_{26}$ alkyl amine (R$_3$—N), a $C_6$-$C_{26}$ alkyl dimethyl amine (R—N(CH$_3$)$_2$), or a di-$C_6$-$C_{26}$ alkyl methyl amines (R$_2$—NCH$_3$);

an alkoxylated amine such as any tertiary alkoxylated fatty amine described previously, for example, the alkoxylated fatty monoamine, alkoxylated fatty alkylene diamine, and the alkoxylated fatty alkylene triamine compounds of formula II, III, IVa/b, respectively; and/or an aprotic nitrogenous heteroarene (optionally substituted) having at least one aromatic nitrogen atom with a reactive lone pair of electrons.

In some embodiments, the quaternary ammonium compound is a chloride, bromide, or methosulfate salt of at least one cation selected from the group consisting of a $C_6$-$C_{22}$ alkyl trimethyl ammonium cation (R—N(+)(CH$_3$)$_3$); a di-$C_6$-$C_{22}$ alkyl dimethyl ammonium cation (R$_2$—N(+)(CH$_3$)$_2$); a $C_6$-$C_{22}$ alkyl benzyl dimethyl ammonium cation (R—N(+)(CH$_3$)$_2$Bn); a quaternized $C_6$-$C_{22}$ alkyl alkylene polyamine ammonium cation; and an N—$C_6$-$C_{22}$ alkyl ammonium cation of a heteroarene.

In some embodiments, the quaternary ammonium compound is a chloride, bromide, or methosulfate salt of at least one cation selected from the group consisting of a fatty trimethyl ammonium cation, a di-fatty dimethyl ammonium cation, a fatty benzyl dimethyl ammonium cation, a quaternized fatty alkylene polyamine ammonium cation, and an N-fatty ammonium cation of a heteroarene, where the fatty portion may be based on or derivable from any fatty amine described previously, preferably from coco amine, stearyl amine, palmitoleylamine, oleylamine, tallow amine, tall oil fatty acid amine, laurylamine, linoleylamine, myristylamine, cetylamine, stearylamine, and soya amine.

Non-limiting examples of quaternary ammonium compounds include, but are not limited to, a $C_{10}$-$C_{18}$ alkyl trimethyl ammonium chloride or methosulfate, a di-$C_{10}$-$C_{18}$ alkyl dimethyl ammonium chloride or methesulfate, a $C_{10}$-$C_{18}$ alkyl benzyl dimethyl ammonium chloride, a methyl quaternized $C_6$-$C_{22}$ alkyl propylene diamine, a methyl quaternized $C_6$-$C_{22}$ alkyl propylene triamine, a methyl quaternized $C_6$-$C_{22}$ alkyl propylene tetraamine, a N—$C_{10}$-$C_{18}$ alkyl pyridinium or a quinolinium bromide or chloride such as N-octyl pyridinium bromide, N-nonyl pyridinium bromide, N-decyl pyridinium bromide, N-dodecyl pyridinium bromide, N-tetradecyl pyridinium bromide, N-dodecyl pyridinium chloride, N-cyclohexyl pyridinium bromide, naphthyl methyl quinolinium chloride, naphthyl methyl pyridinium chloride, and cetylpyridinium chloride, as well as mixtures thereof.

Non-ionic surfactants may include, but are not limited to:
alkanolamides of fatty acids, that is, amide reaction products between a fatty acid and an alkanolamine compound, such as coconut fatty acid monoethanolamide (e.g., N-methyl coco fatty ethanol amide), coconut fatty acid diethanolamide, oleic acid diethanolamide, and vegetable oil fatty acid diethanolamide;

alkoxylated alkanolamides of fatty acids, preferably ethoxylated and/or propoxylated variants of the alkanolamides of fatty acids using for example anywhere from 2 to 30 EO and/or PO molar equivalents, preferably 3 to 15 EO and/or PO molar equivalents, preferably 4 to 10 EO and/or PO molar equivalents, preferably 5 to 8 EO and/or PO molar equivalents per moles of the alkanolamide of the fatty acid (e.g., coconut fatty acid monoethanolamide with 4 moles of ethylene oxide);

amine oxides, such as N-cocoamidopropyl dimethyl amine oxide and dimethyl $C_6$-$C_{22}$ alkyl amine oxide (e.g., dimethyl coco amine oxide);

fatty esters, such as ethoxylated and/or propoxylated fatty acids (e.g., castor oil with 2 to 40 moles of ethylene oxide), alkoxylated glycerides (e.g., PEG-24 glyceryl monostearate), glycol esters and derivatives, monoglycerides, polyglyceryl esters, esters of polyalcohols, and sorbitan/sorbitol esters;

ethers, such as (i) alkoxylated $C_1$-$C_{22}$ alkanols, which may include alkoxylated $C_1$-$C_5$ alkanols, preferably ethoxylated or propoxylated $C_1$-$C_5$ alkanols (e.g., dipropylene glycol n-butyl ether, tripropylene glycol n-butyl ether, dipropylene glycol methyl ether, tripropylene glycol methyl ether, diethylene glycol n-butyl ether, triethylene glycol n-butyl ether, diethylene glycol methyl ether, triethylene glycol methyl ether) and alkoxylated $C_6$-$C_{26}$ alkanols (including alkoxylated fatty alcohols), preferably alkoxylated $C_7$-$C_{22}$ alkanols, more preferably alkoxylated $C_8$-$C_{14}$ alkanols, preferably ethoxylated or propoxylated (e.g., cetyl stearyl alcohol with 2 to 40 moles of ethylene oxide, lauric alcohol with 2 to 40 moles of ethylene oxide, oleic alcohol with 2 to 40 moles of ethylene oxide, ethoxylated lanoline derivatives, laureth-3, ceteareth-6, ceteareth-11, ceteareth-15, ceteareth-16, ceteareth-17, ceteareth-18, ceteareth-20, ceteareth-23, ceteareth-25, ceteareth-27, ceteareth-28, ceteareth-30, isoceteth-20, laureth-9/myreth-9, and PPG-3 caprylyl ether); (ii) alkoxylated polysiloxanes; (iii) ethylene oxide/propylene oxide copolymers (e.g., PPG-1-PEG-9-lauryl glycol ether, PPG-12-buteth-16, PPG-3-buteth-5, PPG-5-buteth-7, PPG-7-buteth-10, PPG-9-buteth-12, PPG-12-buteth-16, PPG-15-buteth-20, PPG-20-buteth-30, PPG-28-buteth-35, and PPG-33-buteth-45); and (iv) alkoxylated alkylphenols. In preferred embodiments, the surfactant (d) is an alkoxylated $C_1$-$C_{22}$ alkanol, preferably an alkoxylated $C_8$-$C_{14}$ alkanol, more preferably an ethoxylated $C_8$-$C_{14}$ alkanol such as an ethoxylated fatty alcohol having 8-14 carbon atoms with an EO number of 5-10, commercially available from KAO (Emulgen), Solvay (Rhodasurf), BASF (Disponil), or Akzo-Noble (Ethylan).

Amphoteric surfactants may also be incorporated into the corrosion inhibitor compositions, and may include betaine-type compounds such as:

$C_6$-$C_{22}$ alkyl dialkyl betaines, such as fatty dimethyl betaines (R—N(CH$_3$)$_2$($^+$)—CH$_2$COO$^-$), obtained from a $C_6$-$C_{22}$ alkyl dimethyl amine which is reacted with a monohaloacetate salt (e.g., sodium monochloroacetate), such as $C_{12}$-$C_{14}$ dimethyl betaine (carboxylate methyl $C_{12}$-$C_{14}$ alkyl dimethylammonium);

$C_6$-$C_{22}$ alkyl amido betaines (R—CO—NH—CH$_2$CH$_2$CH$_2$—N(CH$_3$)$_2$($^+$)—CH$_2$COO$^-$ or R—CO—NH—CH$_2$CH$_2$—N(CH$_3$)$_2$($^+$)—CH$_2$COO$^-$), obtained by the reaction of a monohaloacetate salt (e.g., sodium monochloroacetate) with the reaction product of either dimethyl amino propylamine or dimethyl amino ethylamine with a suitable carboxylic acid or ester derivatives thereof, such as $C_{10}$-$C_{18}$ amidopropyl dimethylamino betaine;

$C_6$-$C_{22}$ alkyl sultaines or $C_6$-$C_{22}$ alkyl amido sultaines, which are similar to those $C_6$-$C_{22}$ alkyl dialkyl betaines or $C_6$-$C_{22}$ alkyl amido betaines described above except in which the carboxylic group has been substituted by a sulfonic group (R—N(CH$_3$)$_2$($^+$)—CH$_2$CH$_2$CH$_2$SO$_3^-$ or R—CO—NH—CH$_2$CH$_2$CH$_2$—N(CH$_3$)$_2$($^+$)—CH$_2$CH$_2$CH$_2$SO$_3^-$ or R—CO—NH—CH$_2$CH$_2$—N(CH$_3$)$_2$($^+$)—CH$_2$CH$_2$CH$_2$SO$_3^-$) or a hydroxysulfonic group (R—N(CH$_3$)$_2$($^+$)—CH$_2$CH(OH)—CH$_2$SO$_3^-$ or R—CO—NH—CH$_2$CH$_2$CH$_2$—N(CH$_3$)$_2$($^+$)—CH$_2$CH(OH)—CH$_2$SO$_3^-$ or R—CO—NH—CH$_2$CH$_2$—N(CH$_3$)$_2$($^+$)—CH$_2$CH(OH)—CH$_2$SO$_3^-$), such as $C_{10}$-$C_{18}$ dimethyl hydroxysultaine and $C_{10}$-$C_{18}$ amido propyl dimethylamino hydroxysultaine;

(e) Solvent

The corrosion inhibitor composition may also optionally include a solvent, which may aid solvation of the various ingredients as well as facilitate transfer of the active ingredients to the appropriate location within the wellbore or geological formation. In preferred embodiments, solvent(s) may be added in amounts of at least 10 wt. %, preferably at least 20 wt. %, preferably at least 30 wt. %, preferably at least 40 wt. %, preferably at least 50 wt. %, and up to 90 wt. %, preferably up to 80 wt. %, preferably up to 70 wt. %, preferably up to 60 wt. %, based on a total weight of the corrosion inhibitor composition.

While various solvents may function appropriately, the solvent (e) is preferably at least one selected from the group consisting of water, a polar aprotic solvent, an aromatic solvent, a terpineol, an alcohol with 1 to 18 carbon atoms, a carboxylic acid with 1 to 5 carbon atoms, and a polyol with 2 to 18 carbon atoms. Specific examples may include, but are not limited to, one or more of water, formamide, dimethyl formamide, dimethyl acetamide, methanol, ethanol, propanol, isopropanol, n-butanol, isobutanol, n-pentanol, n-hexanol, terpineol, menthol, prenol, 3-methyl-3-buten-1-ol, 2-ethyl-1-hexanol, 2-ethyl-1-butanol, 2-propylheptan-1-ol, 2-butyl-1-octanol, lauryl alcohol, cetyl alcohol, stearyl alcohol, and oleyl alcohol, formic acid, acetic acid, oxalic acid, glycolic acid, propanoic acid, 3-hydroxypropionic acid, lactic acid, butanoic acid, isobutyric acid, pentanoic acid, ethylene glycol, diethylene glycol, triethylene glycol, tetraethylene glycol, ethylene glycol methyl ether, ethylene glycol ethyl ether, ethylene glycol propyl ether, ethylene glycol butyl ether, diethylene glycol monomethyl ether, diethylene glycol monoethyl ether, propylene glycol, dipropylene glycol, propylene glycol monomethyl ether, pyrocatechol (1,2-benzenediol), resorcinol (1,3-benzenediol), phenol, cresol, benzyl alcohol, 1,3-propanediol, 1,3-butanediol, 2-butoxyethanol, 1,4-butanediol, 1,6-hexanediol, glycerol, pentaerythritol, manitol, sorbitol, as well as mixtures thereof. In preferred embodiments, the solvent is one or more of 2-butoxyethanol, 2-ethyl-1-hexanol, methanol, ethanol, and isopropanol, more preferably 2-butoxyethanol.

(f) Additives

The corrosion inhibitor composition may optionally further include one or more additives to modify the properties or functions of the corrosion inhibitor composition, as needed. Typically, when present, the additive(s) may be incorporated into the corrosion inhibitor compositions herein in an amount of less than 10 wt. %, preferably less than 8.%, preferably less than 6 wt. %, preferably less than 4 wt. %, preferably less than 2 wt. %, preferably less than 1 wt. %, preferably less than 0.5 wt. %, preferably less than 0.1 wt. %, relative to a total weight of the corrosion inhibitor composition.

Additive(s) suitable for use in oil and gas well operations are known by those of ordinary skill in the art, and may include, for example, pH regulating agents e.g., $H_2SO_4$, HCl, NaOH, phosphate buffers such as monosodium phosphate, disodium phosphate, sodium tripolyphosphate buffers, borate buffers;

viscosity modifying agents e.g., bauxite, bentonite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, and halloysite xanthan gum, psyllium husk powder, hydroxyethyl cellulose, carboxymethylcellulose, and polyanionic cellulose, poly (diallyl amine), diallyl ketone, diallyl amine, styryl sulfonate, vinyl lactam, laponite;

chelating agents e.g., ethylene diamine tetraacetic acid (EDTA), diethylene triamine pentaacetic acid (DPTA), hydroxyethylene diamine triacetic acid (HEDTA), ethylene diamine di-ortho-hydroxy-phenyl acetic acid (EDDHA), ethylene diamine di-ortho-hydroxy-paramethyl phenyl acetic acid (EDDHMA), ethylene diamine di-ortho-hydroxy-para-carboxy-phenyl acetic acid (EDDCHA);

stabilizing agents e.g., ethylene glycol, propylene glycol, glycerol, polypropylene glycol, polyethylene glycol, carboxymethyl cellulose, hydroxyethyl cellulose, xanthan gums, polyacrylamides, polysiloxane polyalkyl polyether copolymers, acrylic copolymers, alkali metal alginates and other water soluble alginates, carboxyvinyl polymers, polyvinylpyrollidones, polyacrylates;

intensifiers e.g., formic acid, $C_1$-$C_4$ alkyl formates such as methyl formate and ethyl formate, benzyl formate, formamide, dimethyl formamide, 1,1'-azobisformamide, metal halides such as sodium bromide, potassium bromide, sodium iodide, potassium iodide, copper(I) chloride, copper(I) iodide, copper(II) chloride, copper (II) iodide, antimony chloride, preferably CuI, KI, and formic acid, more preferably CuI;

secondary corrosion inhibitors e.g., chromates, zinc salts, (poly)phosphates, organic phosphorus compounds, propargylic alcohol, pent-4-yn-1-ol, hexynol, ethyl octynol, octynol, 3-phenyl-2-propyn-1-ol, crotonaldehyde, furfural, p-anisaldehyde, phenyl vinyl ketone, β-hydroxypropiophenone, piperazine, hexamethylene tetramine;

dispersing agents e.g., polymeric or co-polymeric compounds of polyacrylic acid, polyacrylic acid/maleic acid copolymers, styrene/maleic anhydride copolymers, polymethacrylic acid and polyaspartic acid;

scale inhibitors e.g., sodium hexametaphosphate, sodium tripolyphosphate, hydroxyethylidene diphosphonic acid, aminotris(methylenephosphonic acid (ATMP), vinyl sulfonic acid, allyl sulfonic acid, polycarboxylic acid polymers such as polymers containing 3-allyloxy-2-hydroxy-propionic acid monomers, sulfonated polymers such as vinyl monomers having a sulfonic acid group, polyacrylates;

defoaming agents e.g., silicone oils, silicone oil emulsions, organic defoamers, emulsions of organic defoamers, silicone-organic emulsions, silicone-glycol compounds, silicone/silica adducts, emulsions of silicone/silica adducts.

Various methods may be used to make the corrosion inhibitor compositions of the present disclosure, and such methods are generally known to those of ordinary skill in the art. By way of example, the methods of formulating the inventive corrosion inhibitor compositions typically involve mixing the cinnamaldehyde compound(s) (a), the alkoxylated fatty amine(s) (b), and the imidazoline compound(s) (c), and optionally any surfactant(s) (d) and additive(s) (f), followed by adding the appropriate solvent(s) (e) and mixing with optional heat (e.g., 40° C. to 95° C.) until a homogeneous solution is reached. However, other orders of addition may also be practiced and the corrosion inhibitor composition may still function as intended.

Properties

The corrosion inhibitor compositions of the present disclosure, an in particular those compositions that employ preferred ratios of the cinnamaldehyde compound (a), the alkoxylated fatty amine (b), and the imidazoline compound (c), provide advantageous corrosion inhibition effects even when introduced to highly corrosive (acidic) systems at high temperatures, even in concentrations as little as 0.5 to 5 gallon per thousand gallons (gpt). The anti-corrosion properties of the corrosion inhibitor compositions herein may be determined by the loss of mass experiments of steel samples according to NACE TM0169/G31-12a Standard Guide for Laboratory Immersion Corrosion Testing of Metals. In some embodiments, the corrosion inhibitor compositions of the present disclosure provide metal corrosion rates of no more than 0.05 $lbs/ft^2 \cdot h$, preferably no more than 0.04 $lbs/ft^2 \cdot h$, preferably no more than 0.03 $lbs/ft^2 \cdot h$, preferably no more than 0.02 $lbs/ft^2 \cdot h$, preferably no more than 0.01 $lbs/ft^2 \cdot h$, preferably no more than 0.009 $lbs/ft^2 \cdot h$, preferably no more than 0.008 $lbs/ft^2 \cdot h$, preferably no more than 0.007 $lbs/ft^2 \cdot h$, more preferably no more than 0.006 $lbs/ft^2 \cdot h$, even more preferably no more than 0.005 $lbs/ft^2 \cdot h$, yet even more preferably no more than 0.004 $lbs/ft^2 \cdot h$, when used in concentrations of 0.5 to 12 gallon per thousand gallons (gpt), under conditions in which the metal is exposed to highly acidic mediums (e.g., 10 to 20 wt. % HCl) at temperatures of 60 to 180° C.

Also contemplated are acidic treatment fluids formulated to include the corrosion inhibitor composition, in one or more of its embodiments, along with an appropriate acid (e.g., hydrochloric acid, hydrofluoric acid, formic acid, acetic acid, sulfuric acid, and the like) in water, for use in oil and/or gas stimulation operations. In these embodiments, a single fluid may be used for acidizing/stimulation of an oil/gas well while also preventing corrosion of downhole equipment. The acidic treatment fluid may include 0.5 to 12 gallon per thousand gallons (gpt) of the corrosion inhibitor composition, for example, from about 0.5 gpt, preferably from about 1 gpt, preferably from about 1.5 gpt, preferably from about 2 gpt, preferably from about 2.5 gpt, preferably from about 3 gpt, preferably from about 3.5 gpt, preferably from about 4 gpt, and up to about 12 gpt, preferably up to about 10 gpt, preferably up to about 8 gpt, preferably up to about 6 gpt, preferably up to about 5 gpt, as well as 5 to 20 wt. %, preferably 10 to 15 wt. % of the acid component (e.g., HCl), relative to a total weight of the acidic treatment fluid.

Oil or Gas Field Methods

Petroleum oil and natural gas wells are typically subjected to numerous chemical treatments during their production life to enhance operation and protect the integrity of the well and all related equipment. Acidic fluids (HCl, HF, etc.) are often used in stimulation operations such as in matrix acidizing and fracture acidizing treatments, where acidic fluids are injected into the well penetrating the rock pores to stimulate the well to improve flow or to remove damage. In matrix acidizing treatments, acidic solutions are either injected into the well to react with and to dissolve the area surrounding the well to remove damage around the wellbore, or introduced into the subterranean formation under pressure (but below the fracture pressure) so that the acidic solution flows into the pore spaces of the formation, where the acidic solution reacts with acid-soluble materials contained in the formation, resulting in an increase in the size of the pore spaces and an increase in the permeability of the formation. In fracture-acidizing treatments, the acidic solution is introduced above the fracture point of the formation to etch flow channels in the fracture face of the formation and to enlarge the pore spaces in the formation. The increase in formation permeability from these types of acidic treatments may increase the recovery of hydrocarbons from the formation. In most cases, acidizing procedures are carried out in calcareous formations such as dolomites, limestones, dolomitic sandstones, and the like.

A common problem associated with using acidic treatment fluids in subterranean formations is the corrosion of metal surfaces in piping, tubing, heat exchangers, reactors, downhole tools, and the other equipment which are exposed to such acid treatments. Further, other corrosive components such as brines, carbon dioxide, hydrogen sulfide, and microorganisms, may be entrained within the acidic stimulation fluids during stimulation, exacerbating the corrosion problem. Moreover, elevated temperatures are commonly encountered in deeper formations which increases the rate of corrosion. Corrosion issues are problematic for any drilling operation, but are even more troublesome in deep-sea operations where replacement of corroded equipment is difficult and costly.

Therefore, it is common practice to employ corrosion inhibitors during acid stimulation treatments of crude oil and natural gas wells. However, many corrosion inhibitors suffer from poor performance at low concentrations and particularly poor performance under high temperatures and under strongly acidic solutions, for example acidic solutions containing greater than or equal to 15 wt. % acid, necessitating the need for large quantities of corrosion inhibitors to be used.

The present disclosure thus provides a method for inhibiting corrosion of metal in contact with an acidic medium in an oil or gas field environment with the corrosion inhibitor compositions described herein, in one or more of their embodiments. As will become clear, the corrosion inhibitor compositions herein are surprisingly effective at inhibiting corrosion of metal even at very low concentrations, and remain effective when employed at low concentrations even under high temperatures in highly acidic mediums.

The corrosion inhibitor compositions of the present disclosure may be deployed during any upstream (exploration, field development, and production operations), midstream (transportation e.g., by pipeline, processing, storage, and distribution), or downstream (manufacturing, refining, wholesale) oil and gas process where metal corrosion is a concern. However, the corrosion inhibitor compositions are particularly effective at combating corrosion caused by concentrated acidic fluids, and thus are advantageously employed during upstream processes, more preferably during acid stimulation treatments where corrosion caused by highly acidic mediums is a primary concern, even more preferably during matrix acidizing treatments.

In some embodiments, the corrosion inhibitor compositions may be injected down the annulus of a well and optionally flushed with solvent. The corrosion inhibitor compositions may be injected before, after, or simultaneously with the acidizing stimulation fluid used in the stimulation process. In some embodiments, the corrosion inhibitor compositions may be injected through suitable injection lines to areas where corrosion can, or is likely to, occur through capillaries or umbilical lines (in many cases at the wellhead if suitable metallurgy is used downhole). The addition of the corrosion inhibitor composition may be manual or it may be automatic, for example, by using chemical injection pumps. In some embodiments, the corrosion inhibitor composition may be stored in a chemical storage tank and a chemical injection pump associated therewith may be used to introduce the corrosion inhibitor composition into the desired location of the operation. In any of the above applications, the corrosion inhibitor compositions may be injected continuously and/or in batches. The chemical injection pump(s) can be automatically or manually controlled to inject any amount of the corrosion inhibitor composition suitable for inhibiting corrosion.

The acidic medium, for example, the acidizing stimulation fluid, may contain a variety of acids such as, for example, hydrochloric acid, formic acid, acetic acid, hydrofluoric acid, sulfuric acid, and the like, as well as mixtures thereof, for example mud acid (mixtures of HCl and HF). Typically, acidic mediums that contain at least 5 wt. %, preferably at least 10 wt. %, preferably at least 15 wt. %, and up to 31 wt. %, preferably up to 28 wt. % of the acid(s) (e.g., HCl), based on a total weight of the acidic medium, are used for acid stimulation treatments, although more concentrated (e.g., about 37 wt. %) or dilute versions of the acidic medium may also be used. In some embodiments, the acidic medium has a pH of less than 3, preferably less than 2, preferably less than 1, for example from −1.1 to 2, or from −1 to 0. The corrosion inhibitor compositions of the present disclosure are thus formulated to combat corrosion of metal equipment that comes into contact with such concentrated acidic mediums.

Further, the disclosed methods may be effective for inhibiting corrosion of metal caused by contact with various types of acidic mediums, including aqueous mediums as well as multi-phase mixtures (e.g., water-oil mixtures and water-oil-gas mixtures), the latter often being produced downhole after the acidizing stimulation fluids are introduced into the wellbore or geological formation, and when the acidizing stimulation fluids entrain some of the produced oil and gas formation fluids. Therefore, in addition to the acid(s) listed above, the acidic mediums may also contain other corrosive agents, including, but not limited to, carbon dioxide, corrosive sulfur species (e.g., hydrogen sulfide, mercaptans, etc.), brine, as well as mixtures thereof.

The acidic mediums in which the corrosion inhibitor compositions are applied to may be in contact with many different types of surfaces on tubing and field equipment that are susceptible to corrosion. Illustrative examples of which include, but are not limited to, separation vessels, dehydration units, gas lines, pipelines, cooling water systems, valves, spools, fittings (e.g., such as those that make up the well Christmas tree), treating tanks, storage tanks, coils of heat exchangers, fractionating columns, cracking units, pump parts (e.g., parts of beam pumps), and in particular downhole surfaces that are most likely to come into contact with the acidic mediums during stimulation operations, such as those casings, liners, pipes, bars, pump parts such as sucker rods, electrical submersible pumps, screens, valves, fittings, and the like.

Any metal surface that may come into contact with the acidic medium may be protected by the corrosion inhibitor compositions of the present disclosure. Typical metals found in oil and gas field environments that may be protected include carbon steels (e.g., mild steels, high-tensile steels, higher-carbon steels); high alloy steels including chrome steels, ferritic alloy steels, austenitic stainless steels, precipitation-hardened stainless steels high nickel content steels; galvanized steel, aluminum, aluminum alloys, copper, copper nickel alloys, copper zinc alloys, brass, ferritic alloy steels, and any combination thereof. Specific examples of typical oil field tubular steels include J-55, N-80, L-80, P:105, P110, and high alloy chrome steels such as Cr-9, Cr-13, Cr-2205, Cr-2250, and the like.

In general, the dosage of the corrosion inhibitor compositions may be dependent upon the corrosivity of the system, as well as various other considerations such as the temperature of the acidic medium that is or will be in contact with the metal surface(s) of interest. While dosages above 12 gpt (gallons per thousand gallons of acidic medium) may be used, the corrosion inhibitor compositions employed in the practice of this invention are surprisingly effective in protecting oil and gas well tubing and other metal equipment from corrosion in concentrations from about 0.5 gpt, preferably from about 1 gpt, preferably from about 1.5 gpt, preferably from about 2 gpt, preferably from about 2.5 gpt, preferably from about 3 gpt, preferably from about 3.5 gpt, preferably from about 4 gpt, and up to about 12 gpt, preferably up to about 10 gpt, preferably up to about 8 gpt, preferably up to about 6 gpt, preferably up to about 5 gpt, even when introduced into highly acidic mediums, such as those described previously. These concentrations may be easily calculated from the amount of corrosion inhibitor compositions and the amount of acidizing stimulation fluid introduced for the stimulation treatment. These concentrations may also be directly measured from sampling the acidic medium in the wellbore, and subjecting the sample to mass spectroscopy analysis. Such direct measurements may be preferred when the amounts of added corrosion inhibitor compositions and acidizing stimulation fluid are unknown, or in situations where a significant amount of formation fluid (brine, oil, gas, etc.) has been entrained.

The corrosion inhibitor compositions disclosed herein perform surprisingly well at temperatures even up to 180° C., preferably up to 170° C., preferably up to 160° C., preferably up to 150° C., preferably up to 140° C., preferably up to 130° C., preferably up to 120° C., for example 60 to 180° C., preferably 80 to 160° C.

In some situations, for example, under particularly harsh conditions, the methods may also optionally involve introducing an intensifier into the acidic medium to further diminish the rate of corrosion. Suitable intensifiers may include, but are not limited to, formic acid, $C_1$-$C_4$ alkyl formates such as methyl formate and ethyle formate, benzyl formate, formamide, dimethyl formamide, 1, 1'-azobisformamide, metal halides such as, sodium bromide, potassium bromide, sodium iodide, potassium iodide, copper(I) chloride, copper(I) iodide, copper(II) chloride, copper(II) iodide, and antimony chloride. In preferred embodiments, at least one of CuI, KI, and formic acid is employed as the intensifier, more preferably CuI. The intensifier may be introduced into the acidic medium before, during, and/or after the corrosion inhibitor composition is introduced. In some embodiments, the intensifier is solid (e.g., CuI and KI), and is introduced into the acidic medium at a concentration of from about 0.5 pounds per thousand gallons (ppt), preferably from about 1 ppt, preferably from about 2 ppt, preferably from about 5 ppt, preferably from about 10 ppt, preferably from about 15 ppt, preferably from about 20 ppt, and up to about 50 ppt, preferably up to about 45 ppt, preferably up to about 40 ppt, preferably up to about 35 ppt, preferably up to about 30 ppt, preferably up to about 25 ppt. In some embodiments, the intensifier is liquid (e.g., formic acid) and is introduced into the acidic medium at a concentration of from about 1 gpt, preferably from about 2 gpt, preferably from about 3 gpt, preferably from about 4 gpt, preferably from about 5 gpt, preferably from about 10 gpt, and up to about 200 gpt, preferably up to about 150 gpt, preferably up to about 100 gpt, preferably up to about 80 gpt, preferably up to about 60 gpt, preferably up to about 40 gpt.

The methods herein provide protection for various metal surfaces by achieving metal corrosion rates of no more than 0.05 lbs/ft$^2$·h, preferably no more than 0.04 lbs/ft$^2$·h, preferably no more than 0.03 lbs/ft$^2$·h, preferably no more than 0.02 lbs/ft$^2$·h, preferably no more than 0.01 lbs/ft$^2$·h, preferably no more than 0.009 lbs/ft$^2$·h, preferably no more than 0.008 lbs/ft$^2$·h, preferably no more than 0.007 lbs/ft$^2$·h, more preferably no more than 0.006 lbs/ft$^2$·h, even more preferably no more than 0.005 lbs/ft$^2$·h, yet even more preferably no more than 0.004 lbs/ft$^2$·h, when the corrosion inhibitor compositions are introduced in concentrations of 0.5 to 12 gallon per thousand gallons (gpt) under conditions in which the metal is exposed to highly acidic mediums (e.g., 10 to 20 wt. % HCl) at temperatures of 60 to 180° C. Such metal corrosion rates may be tested in real-time by placing a sacrificial metal sample in the wellbore environment and measuring the percent weight loss, or alternatively, by using a laboratory experiment the mimics the conditions of the well (temperature, corrosion inhibitor composition dosage, acidic medium pH, etc.) and measuring percent weight loss of metal as described hereinafter (see loss of mass test).

Of course, the methods herein do not preclude introduction of other known chemical treatments into oil and gas field production and downstream transportation, distribution, and/or refining systems, and thus the corrosion inhibitor compositions may be used in conjunction with other chemical treatments known to those of ordinary skill in the art, including, but not limited to, hydrate inhibitors, scale inhibitors, asphaltene inhibitors, paraffin inhibitors, $H_2S$ scavengers, $O_2$ scavengers, emulsion breakers, foamers and defoamers, buffers, and water clarifiers.

The examples below are intended to further illustrate protocols for preparing and testing the corrosion inhibitor compositions and are not intended to limit the scope of the claims.

EXAMPLES

Corrosion Inhibition Testing Protocol

The following loss of mass test was carried out in accordance with NACE TM0169/G31-12a Standard Guide for Laboratory Immersion Corrosion Testing of Metals to determine the anti-corrosion properties of the corrosion inhibitor compositions:

1. Round N80 mild steel coupon with dimensions of ⅛" THICK×1¼" DIAMETER are surface polished with sandpaper. Then, they are degreased by introducing them into a container with isopropyl alcohol and they are left in an ultrasound bath for 3 minutes. They are air-dried and weighed in a balance with an accuracy of ±0.001 g.

2. 50 ml of 15% HCl (obtained by diluting commercial concentrated 37% HCl) is added into a Teflon-lined stainless steel 316 hydrothermal autoclave. Then the appropriate amount of the corrosion inhibitor composition is added per the inhibitor dosages listed in Tables 1-5 below.

3. The previous mixture is shaken manually and subsequently a degreased and weighed (according to 1) steel test piece is introduced into each autoclave in a tilted position such that it is completely covered by the acid solution.

4. Once the test piece is introduced into the autoclave containing the acid solution, the autoclave is closed by screwing on the cap and placed into an oven, where it is kept for a desirable amount of hours (according to Table 1-5 below) at autonomous/equilibrated pressure and at the desired temperature (e.g., 80° C., 120° C., 140° C., 160° C.). Subsequently, it is quenched in ice-water bath. When the autoclave is removed, it is at about room temperature.

5. Subsequently, the steel test piece is removed with pincers, is introduced into a 10 wt. % sodium bicarbonate bath so as to neutralize the remaining acid and then it is cleaned by rubbing the surface of the plate with a brush and soapy water. Afterwards, it is cleaned first with limonene and then with isopropyl alcohol. It is air-dried and then weighed with an accuracy of ±0.001 g. The corrosion rate is presented as the loss of mass in pounds per square foot per hour (lbs/ft²·h).

Corrosion Inhibitor Composition Preparation Methods

Example 1: Preparation of Entry 1 in Table 1

In an appropriate container, 25 g cinnamaldehyde, 15 g Amiet 505, 5 g Imidazoline TO-3, 5 g CRS1020, and 50 g 2-butoxyethanol are added. Gentle stirring is applied until a uniform solution is formed.

Corrosion Inhibition Testing

In the tables below, several corrosion inhibitor compositions were tested at various dosages (gpt) and temperatures (° C.) using a 15 wt. % HCl acidic medium as described above, and the results are presented below in terms of corrosion rate in pounds per square foot per hour (lbs/ft²·h). Several corrosion inhibitor compositions were also tested in conjunction with various intensifiers at different dosages (ppt or gpt). * Denotes a comparative example.

The components (e.g., cinnamaldehyde (a)) of the corrosion inhibitor compositions are expressed in terms of wt. %, based on a total wt. % of 100. Imidazoline (c) refers to a mixture of imidazoline compound and fatty amidoamine (69% by weight imidazoline, TO-3) obtained from reaction between tall oil fatty acid and diethylenetriamine (DETA). CRS1020 is an ethoxylated $C_8$-$C_{14}$ alkanol surfactant (EO number of 5-10), commercially available from ChemEOR. The solvent is 2-butoxyethanol.

TABLE 1

| Entry | Cinnamaldehyde (a) | Amiet 505 (b) | Imidazoline (c) | a/b | a/c | b/c | CRS1020 | Solvent | Dosage (gpt) | Intensifier (dosage) | Temp. (°C.) | Corrosion rate (lbs/ft²·h) |
|---|---|---|---|---|---|---|---|---|---|---|---|---|
| 1 | 25 | 15 | 5 | 1.67 | 5.00 | 3.00 | 5 | 50 | 2 | - | 120 | 0.0035 |
| 2 | 25 | 5 | 15 | 5.00 | 1.67 | 0.33 | 5 | 50 | 2 | - | 120 | 0.0047 |
| 3 | 25 | 5 | 20 | 5.00 | 1.25 | 0.25 | - | 50 | 2 | - | 120 | 0.0046 |
| 4 | 25 | 20 | 5 | 1.25 | 5.00 | 4.00 | - | 50 | 2 | - | 120 | 0.0049 |
| 5 | 15 | 9 | 3 | 1.67 | 5.00 | 3.00 | 3 | 70 | 2 | - | 120 | 0.0094 |
| 6 | 5 | 25 | 15 | 0.20 | 0.33 | 1.67 | - | 55 | 2 | - | 120 | 0.0139 |
| 7 | 40 | 5 | 5 | 8.00 | 8.00 | 1.00 | - | 50 | 2 | - | 120 | 0.0075 |
| 8 | 20 | 20 | 10 | 1.00 | 2.00 | 2.00 | - | 50 | 2 | - | 120 | 0.0039 |
| 9 | 10 | 15 | 25 | 0.67 | 0.40 | 0.60 | - | 50 | 2 | - | 120 | 0.0098 |
| 10 | 10 | 30 | 10 | 0.33 | 1.00 | 3.00 | - | 50 | 2 | - | 120 | 0.0075 |
| 11* | 50 | - | 25 | 25 | - | 1.00 | - | - | - | 2 | 120 | 0.0055 |
| 12* | 50 | - | 33 | 17 | - | 1.94 | - | - | - | 2 | 120 | 0.0067 |
| 13* | 50 | - | 17 | 33 | - | 0.52 | - | - | - | 2 | 120 | 0.0073 |
| 14* | 25 | - | 25 | - | 1.00 | 0.00 | - | 50 | 2 | - | 120 | 0.0083 |
| 15* | 33 | - | 17 | - | 1.94 | 0.00 | - | 50 | 2 | - | 120 | 0.0077 |
| 16* | 17 | - | 33 | - | 0.52 | 0.00 | - | 50 | 2 | - | 120 | 0.0087 |
| 17 | 25 | 15 | 5 | 1.67 | 5.00 | 3.00 | 5 | 50 | 2 | - | 160 | 0.2019 |
| 18 | 25 | 15 | 5 | 1.67 | 5.00 | 3.00 | 5 | 50 | 2 | CuI (5 ppt) | 160 | 0.0044 |
| 19 | 25 | 15 | 5 | 1.67 | 5.00 | 3.00 | 5 | 50 | 2 | KI (5 ppt) | 160 | 0.0207 |
| 20 | 25 | 15 | 5 | 1.67 | 5.00 | 3.00 | 5 | 50 | 2 | Formic acid (5 gpt) | 160 | 0.0350 |

TABLE 2

| Entry | Cinnamaldehyde (a) | Amiet 302 (b) | Imidazoline (c) | a/b | a/c | b/c | CRS1020 | Solvent | Dosage (gpt) | Temp. (°C.) | Corrosion rate (lbs/ft²·h) |
|---|---|---|---|---|---|---|---|---|---|---|---|
| 1 | 25 | 16.7 | 8.3 | 1.50 | 3.01 | 2.01 | — | 50 | 2 | 120 | 0.0038 |
| 2 | 25 | 8.3 | 16.7 | 3.01 | 1.50 | 0.50 | — | 50 | 2 | 120 | 0.0102 |
| 3 | 25 | 20 | 5 | 1.25 | 5.00 | 4.00 | — | 50 | 2 | 120 | 0.0047 |

TABLE 3

| Entry | Cinnamaldehyde (a) | Amiet 308 (b) | Imidazoline (c) | a/b | a/c | b/c | CRS1020 | Solvent | Dosage (gpt) | Temp. (° C.) | Corrosion rate (lbs/ft² · h) |
|---|---|---|---|---|---|---|---|---|---|---|---|
| 1* | 25 | 25 | — | 1.00 | — | — | — | 50 | 2 | 120 | 0.0191 |

TABLE 4

| Entry | Cinnamaldehyde (a) | Amiet 320 (b) | Imidazoline (c) | a/b | a/c | b/c | CRS1020 | Solvent | Dosage (gpt) | Temp. (° C.) | Corrosion rate (lbs/ft² · h) |
|---|---|---|---|---|---|---|---|---|---|---|---|
| 1 | 25 | 15 | 5 | 1.67 | 5.00 | 3.00 | 5 | 50 | 2 | 120 | 0.0068 |
| 2 | 25 | 10 | 15 | 2.50 | 1.67 | 0.67 | — | 50 | 2 | 120 | 0.0092 |
| 3 | 25 | 5 | 20 | 5.00 | 1.25 | 0.25 | — | 50 | 2 | 120 | 0.0075 |

TABLE 5

| Entry | Cinnamaldehyde (a) 25 Temp. (° C.) | Amiet 505 (b) 15 HCl concentration (wt.%) | Imidazoline (c) 5 Time (h) | CRS1020 5 Inhibitor Dosage (gpt) | Solvent 50 Intensifier (dosage) | Corrosion rate (lbs/ft² · h) |
|---|---|---|---|---|---|---|
| 1 | 80 | 15 | 6 | 1 | — | 0.0035 |
| 2 | 80 | 15 | 6 | 2 | — | 0.0047 |
| 3 | 80 | 15 | 24 | 2 | — | 0.0046 |
| 4 | 120 | 15 | 4 | 2 | — | 0.0049 |
| 5 | 120 | 15 | 12 | 2 | — | 0.0094 |
| 6 | 140 | 15 | 6 | 2 | — | 0.0139 |
| 7 | 140 | 15 | 6 | 6 | — | 0.0075 |
| 8 | 140 | 15 | 6 | 12 | — | 0.0039 |
| 9 | 160 | 15 | 4 | 10 | — | 0.0098 |
| 10 | 160 | 15 | 4 | 2 | formic acid (5 gpt) | 0.0075 |
| 11 | 160 | 15 | 4 | 2 | CuI (0.5 ppt) | 0.0055 |
| 12 | 160 | 15 | 4 | 2 | CuI (1 ppt) | 0.0067 |
| 13 | 160 | 15 | 4 | 2 | CuI (2.5 ppt) | 0.0073 |
| 14 | 160 | 15 | 4 | 2 | CuI (5 ppt) | 0.0083 |
| 15 | 160 | 15 | 8 | 2 | CuI (2.5 ppt) | 0.0077 |
| 16 | 160 | 15 | 8 | 5 | CuI (1 ppt) | 0.0087 |
| 17 | 160 | 15 | 8 | 5 | CuI (2.5 ppt) | 0.2019 |
| 18 | 160 | 15 | 20 | 5 | CuI (2.5 ppt) | 0.0044 |

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A method of inhibiting corrosion of metal in contact with an acidic medium in an oil or gas field environment, the method comprising:
   introducing a corrosion inhibitor composition into the acidic medium,
   wherein the corrosion inhibitor composition comprises:
   (a) a cinnamaldehyde compound;
   (b) an alkoxylated fatty amine; and
   (c) an imidazoline compound,
   wherein a weight ratio of the cinnamaldehyde compound (a) to the alkoxylated fatty amine (b) is from 1:6 to 50:1.

2. The method of claim 1, wherein the acidic medium comprises HCl.

3. The method of claim 1, wherein the corrosion inhibitor composition inhibits corrosion of the metal at a temperature of from 60 to 180° C.

4. The method of claim 1, further comprising introducing an intensifier into the acidic medium.

5. The method of claim 4, wherein the intensifier is at least one selected from the group consisting of CuI, KI, and formic acid.

6. The method of claim 1, wherein the alkoxylated fatty amine (b) is an ethoxylated fatty monoamine.

7. The method of claim 1, wherein the imidazoline compound (c) is formed from a reaction between tall oil fatty acid, or an ester derivative thereof, and diethylenetriamine (DETA) or aminoethylethanolamine (AEEA).

8. The method of claim 1, wherein a weight ratio of the cinnamaldehyde compound (a) to the alkoxylated fatty amine (b) is from 1:2 to 15:1.

9. The method of claim 1, wherein a weight ratio of the cinnamaldehyde compound (a) to the alkoxylated fatty amine (b) is from 1:1 to 3:1.

10. The method of claim 1, wherein a weight ratio of the cinnamaldehyde compound (a) to the imidazoline compound (c) is from 1:2 to 35:1.

11. The method of claim 1, wherein a weight ratio of the cinnamaldehyde compound (a) to the imidazoline compound (c) is from 1:1 to 5:1.

12. The method of claim 1, wherein a weight ratio of the alkoxylated fatty amine (b) to the imidazoline compound (c) is from 1:2 to 4:1.

13. The method of claim 1, wherein the corrosion inhibitor composition comprises, relative to a total weight of the corrosion inhibitor composition:
    (a) from 5 to 50 wt. % of the cinnamaldehyde compound;
    (b) from 1 to 30 wt. % of the alkoxylated fatty amine; and
    (c) from 0.1 to 25 wt. % of the imidazoline compound.

14. The method of claim 1, wherein the corrosion inhibitor composition further comprises (d) a surfactant.

15. The method of claim 14, wherein the surfactant (d) is a quaternary ammonium compound.

16. The method of claim 14, wherein the surfactant (d) is an alkoxylated $C_1$-$C_{22}$ alkanol.

17. The method of claim 14, wherein the corrosion inhibitor composition comprises from 0.1 to 25 wt. % of the surfactant (d), relative to a total weight of the corrosion inhibitor composition.

18. The method of claim 1, wherein the corrosion inhibitor composition further comprises (e) a solvent.

19. The method of claim 18, wherein the solvent (e) is at least one selected from the group consisting of water, a polar aprotic solvent, an aromatic solvent, a terpineol, an alcohol having from 1 to 18 carbon atoms, a carboxylic acid having from 1 to 5 carbon atoms, and a polyol having from 2 to 18 carbon atoms.

* * * * *